Patented Dec. 17, 1929

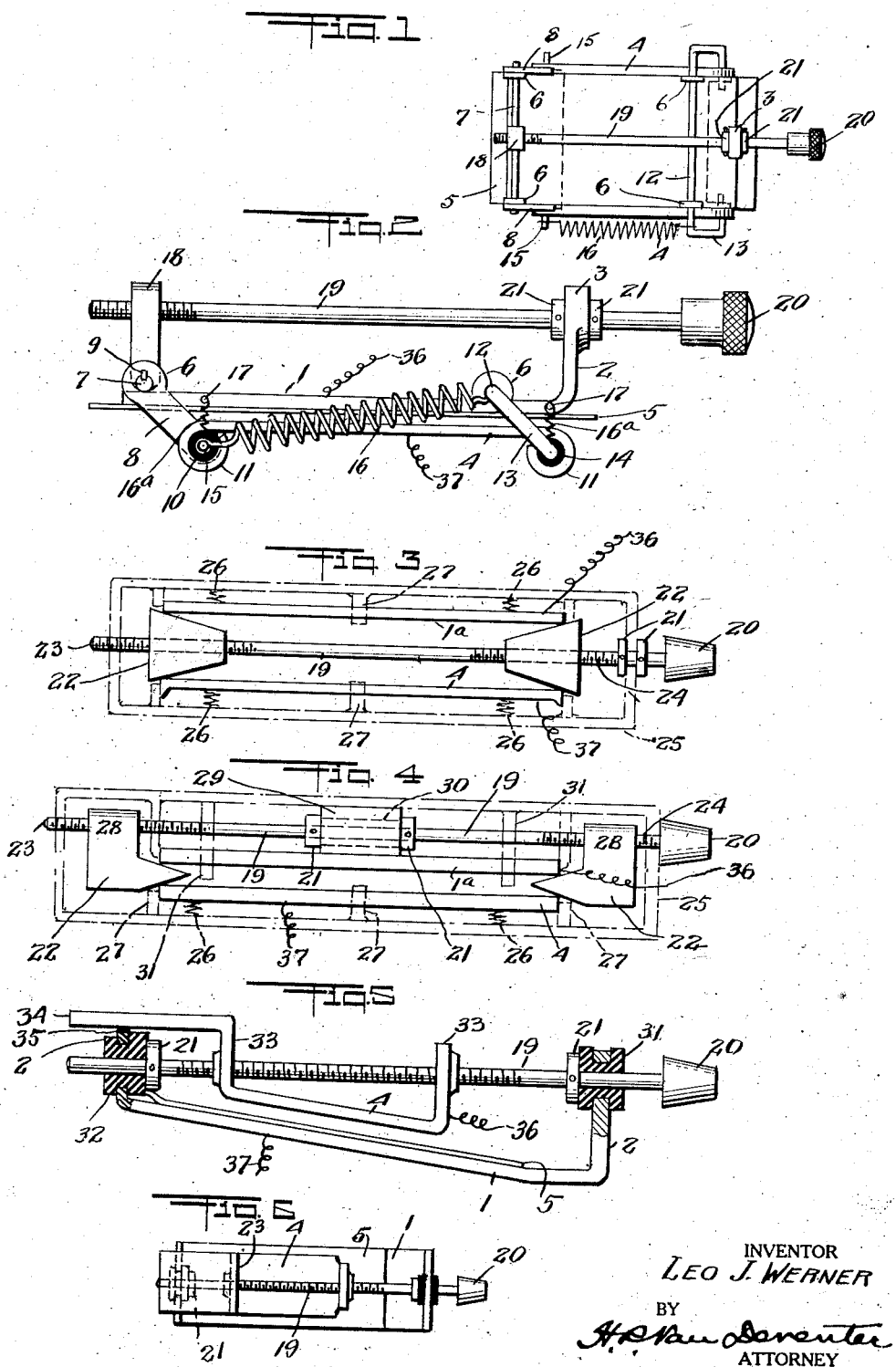

1,740,131

UNITED STATES PATENT OFFICE

LEO J. WERNER, OF ARLINGTON, NEW JERSEY, ASSIGNOR TO DUBILIER CONDENSER CORPORATION, OF NEW YORK, N. Y., A CORPORATION OF DELAWARE

CONDENSER

Application filed September 3, 1924. Serial No. 735,590.

My invention relates to improvements in electrical condensers, especially condensers so constructed that the capacity thereof can be varied.

An object of the invention is to provide a condenser having parts adapted for fine and precise adjustment, and the nature and advantages of the invention are set forth in the following specification taken with the drawings in which several forms of condensers according to my invention are illustrated.

The disclosure, however, is explanatory only, and I may make changes not necessarily illustrated herein, but embraced within the principle of the invention, consistent with the breadth of the appended claim.

On the drawings,

Figure 1 is a top view of one form of a condenser according to my invention;

Figure 2 is a side view thereof;

Figures 3, 4 and 5 are side views of other specific structures containing my invention; and Figure 6 is a top plan of the modification shown in Figure 5.

On the drawings, the same numerals identify the same parts throughout.

In Figures 1 and 2 I show an element or plate of conductive material 1 having a lateral projection 2 at one end supporting a bearing 3; and co-operating with said plate or element 1 is another plate or conductive element 4, the position of which, with respect to that of the element 1, can be altered. One of these plates will be connected to one terminal of an electric circuit, and the other plate to the opposite terminal of the said circuit, and between the two plates, I dispose a sheet or plate of insulation or dielectric 5 which is shown as being attached to one of the plates such as the plate 1. This plate 1 has a pair of bearings 6 on each side adjacent the ends thereof, and through one of these bearings passes a shaft 7 carrying at its extremities arms 8 which are made rigid with said shaft by any suitable means such as a key 9. The arms 8 project over the sides of the plate 1 and insulation 5 and carry journals 10 which engage bearings 11 at the adjacent end of the plate or element. These bearings can be provided by cutting and bending portions of the plate 4 in the required manner. The other two bearings 6 mount a shaft 12 which has laterally projecting arms 13 at its two ends extending over the sides of the plates 1 and 5, with insulating sleeves 14 on their lower ends to engage bearings 11 similar to the bearings 6 above-mentioned, at the other end of the plate 4. The arms 13 may have their extremities bent over towards each other, and the insulating sleeves 14 can be slipped upon these bent over extremities and inserted into the bearings 11, so that the conductive element 4 will be electrically insulated from the plate 1. The arms 8 may be of insulation and even if the arms 13 are of metal, the insulation 14 will prevent contact between these arms and the element 4. The journals 10 at the ends of the arms 8 may be provided with pin 15 and this pin anchors one end of a spring 16 which is made fast at its opposite extremity to the shaft 12. This spring tends to draw the arms 8 to the right and thus cause the element 4 to move as close as possible towards the element 1, the arms 8 and arms 13 acting as links to hold the plate 4 in position parallel to the plate 1 in every adjustment that is given to this plate 4; and with the arms 8 of insulation and one end of the spring 16 at its point of attachment with these arms insulated from the plate 4, the two plates will not be short-circuited by this spring even though the opposite end of the spring is connected directly to the shaft 12. Of course, if desired, the shaft 12 and arms 13 can be made of insulation or of metal covered with insulation. I further may use two springs 16ª, one attached to the pin 15 at one end of the condenser, and the other attached to the end of one of the arms 13 at the other extremity of the condenser, these springs also being joined to studs or pins 17 of insulation or other material suitably insulated from the plate 1 to assist the spring 16 in drawing the plate 4 towards the plate 1. Any other suitable arrangement or choice of parts may be adapted for keeping the plates 1 and 4 electrically separated, and insulating from these plates any adjoining operating parts of conductive material, if metal, for example, is used, and thus prevent short-circuiting of the two plates. The springs 16ª are not shown in Figure 1, for the sake of clearness, and of course the springs 16 and 16ª may be on both sides of the condenser if desired.

Fixed to the shaft 7 and extending away from the plate 1 is a rigid arm 18 having a threaded opening to receive the threaded end of an operating rod 19 carrying on its opposite extremity a knob 20. This rod also passes through a smooth opening in the bearing 3 and carries two fixed collars 21 abutting the opposite sides of the bearing to hold this rod against longitudinal movement. Hence, when this rod is turned, the arm 18 can be drawn towards the bearing 3 turning the shaft 7 and causing the arms 8 to pull upon the spring 16 and, at the same time, move the plate 4, the arms 8 and 13 keeping the plates 1 and 4 parallel, and thus the capacity of the condenser can be varied by the means for altering the relative positions of the plates comprising the rod 19 and parts actuated thereby.

It will be noted while the plate 4 can move towards and from the plate 1, it also has longitudinal movement, at the same time, but in all of its positions, it is parallel to the plate 1 and to itself.

In Figure 3, a plate or element of conductive material 4 is associated with another plate or element of conductive material 1ª and these two plates are mounted so that they always move directly towards and from each other and remain parallel with each other without any longitudinal displacement. Between these two plates at each end is a wedge block 22 through which passes an operating rod 19 threaded in opposite directions adjacent its two extremities, so that when this rod is turned, it will draw the wedge members 22 together or move them apart, to increase or decrease the space between the plate 1ª and 4. The two opposite threaded portions of the rod are indicated at 23 and 24 and, if desired, the condenser may be enclosed in a housing indicated in broken lines by the numeral 25. An opening in the ends of the housing may serve as a bearing for the rod 19. Springs 26 disposed between the plates 1ª and 4 in the top and bottom of this casing may normally tend to force the plates towards each other. Further, the top and bottom of the casing 25 may carry on the interior guides 27 to prevent edgewise displacement of the plates. Hence, when the members 22 are drawn together, they force the plates apart and when they are moved away from each other, the springs 26 move the plates towards each other. The rod is, of course, held against longitudinal movement, as before, because the two fixed collars thereof engage the inner and outer faces of the casing 25.

In Figure 4, I show a type of condenser somewhat similar to that of Figure 3, except that the wedge blocks instead of having the rod passing directly through the same are provided with extensions 28 with threaded openings for the portions 23 and 24 of the rod, and the plate 1ª has a projection or block 29 fast to the top of same, this block having a longitudinal opening 30 therein of greater diameter than the rod 19. Springs 26 may normally tend to move the plate 4 upward and guides 27 be provided as before, to engage the edges of the lower plate; while the plate 1ª may be caused to depend upon its own weight to seek the lower level, so that when the knob 20 is moved to withdraw the wedge blocks 22, the plate 4 is moved up a little by the springs 26; while the plate 1ª simply sinks because the enlarged opening 30 permits this plate to sink somewhat, without interference from the rod 19. Guides 31 may extend down from the top of the casing 25 and engage the opposite edges of the plate 1ª. Of course, the rod 19 and the projection 29 will be located about the middle of the width, as well as of the length of the plate 1ª, and will not interfere with any guides 31 depending from the top of the casing into proximity, to the sides or edges of this plate. The fixed collars 21 on the rod 19 abut the opposite ends of the projection 29 and prevent longitudinal movement of the rod. Of course, the wedge blocks 22 and the casing 25 should be of insulation.

In this form of condenser, the plates move towards and from each other directly and are never displaced longitudinally or laterally, and always remain parallel to each other.

In the condenser of Figures 5 and 6, a plate or element 1 of conductive material has lateral projections 2 on its opposite ends which receive perforated insulating bushings 32 through which passes the rod 19 with fixed collars 21 thereof abutting the bushings or linings to hold the rod against longitudinal movement, while permitting it to rotate. The plate 4 also has lateral projections at its two ends with threaded openings to be engaged by threads on the rod 19, and one of the projections 33 has an extension 34 to project across the extremity of the adjacent projection 2, and thus be prevented from turning upon the rod 19 as an axis. The rod 19 may make an angle to the plane of the plates 1 and 4 and by turning the rod, the distance of the plate 4 from the plate 1 is adjusted, while the plate 4 still remains parallel to the plate 1. The top of the projection 2 may be straight and parallel with the flat under face of the projection 34, and kept out of contact therewith by insulation 35, or the lower face of the projection 34 may be covered with a sheet of insulation, like insulation 5. The conductors for uniting the plates 1 and 4 into an electric circuit are diagrammatically indicated at 36 and 37.

Of course, the condensers shown in Figures 1, 2, 5 and 6 can also be enclosed in a suitable container, or mounted upon a switchboard or panel as desired.

Having described my invention, what I believe to be new and desire to secure and protect by Letters Patent of the United States is:—

A condenser comprising a pair of electrically conductive elements spaced apart, wedge members to extend between the opposite ends of said elements, said members having extensions, a rod passing through said extensions and having oppositely threaded portions to engage said extensions, a projection on one of said plates through which said rod passes, said projection having an opening larger than said rod, and fixed collars on said rod abutting the opposite extremities of the projection, whereby when the rod is turned, it is held against longitudinal movement and can draw the wedge members together or move them apart to control the position of said elements.

Signed at New York in the county of New York and State of New York this 27th day of August A. D. 1924.

LEO J. WERNER.